Figure 1:
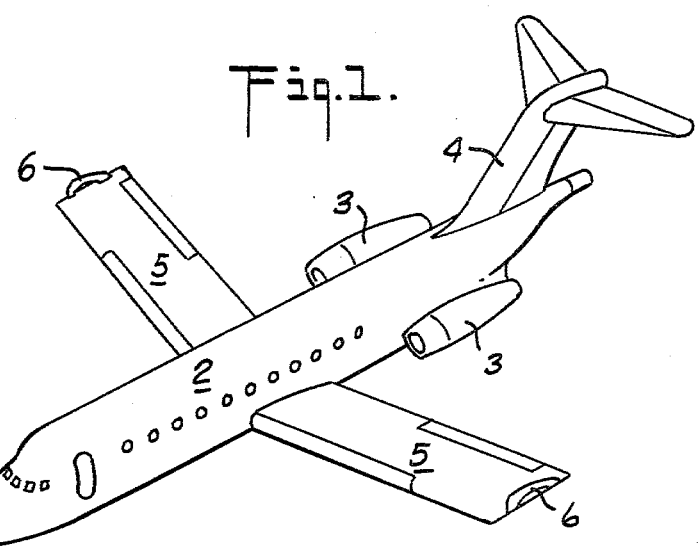

United States Patent [19]

McGann

[11] 4,238,094
[45] Dec. 9, 1980

[54] AIRCRAFT WING FENCE

[76] Inventor: Rodney McGann, 4187 Old San Jose Rd., Santa Cruz, Calif. 95065

[21] Appl. No.: 957,049

[22] Filed: Nov. 2, 1978

[51] Int. Cl.² ............................................. B64C 5/06
[52] U.S. Cl. ..................................... 244/91; 114/274; 244/130; 244/199
[58] Field of Search ................. 244/91, 130, 198, 199; 114/274

[56] References Cited

U.S. PATENT DOCUMENTS

| 1,808,996 | 6/1931 | Royster | 244/198 |
| 2,125,738 | 8/1938 | Rose | 244/199 |
| 2,885,161 | 5/1959 | Kerker et al. | 244/91 |
| 3,693,913 | 9/1972 | Barland et al. | 244/130 |

FOREIGN PATENT DOCUMENTS 479649  2/1928  Fed. Rep. of Germany ............. 244/91
546993 12/1929  Fed. Rep. of Germany ............. 244/91

OTHER PUBLICATIONS

A. R. Weyl, "Stability of Tailless Aeroplanes", *Aircraft Engineering*, Apr. 1945, pp. 103-111.

*Primary Examiner*—Charles E. Frankfort
*Attorney, Agent, or Firm*—Cooper, Dunham, Clark, Griffin & Moran

[57] ABSTRACT

An improved fluid fence which reduces drag on solid objects moving through a fluid environment and an airfoil or aircraft wing structure having an improved open fence on its surface improving the lift-to-drag characteristics of the airfoil.

7 Claims, 4 Drawing Figures

U.S. Patent      Dec. 9, 1980      4,238,094

AIRCRAFT WING FENCE

The invention relates to an improved fluid fence, and to an airfoil or aircraft wing structure having an open fence on its surface.

When a solid object is moved through a fluid, turbulence is created in the fluid, the amount of turbulence depending, to a large extent on the shape of the solid. Fluid vortices are usually created which result in resistance to movement of the object; this resistance to movement is often termed "drag". When an aircraft wing, for example, passes through air creating lift, the pressure on the lower surface of the wing is greater than that of its upper surface. Consequently, air flows around the tip of the wing from the lower to the upper surface. The flow of air from the high pressure region below the wing to the low pressure region about it sets up vortices at the wing tips and creates drag on the aircraft. The vortex drag effect is particularly pronounced with aircraft having low aspect ratios and is greatest during those periods of operations requiring a high angle of wing to air attack, as during take-off, landing, and initial climb operations.

During take-offs and initial climb, vertically disposed fences, provided at the ends of the wings will decrease the drag and produce an increase in maximum lift. During landing, the fences reduce tip spill from the wings to permit landing at lower speeds.

Aircraft wing fences, fins, or dams are known to be useful for reducing the aerodynamic drag of aircraft wings and are illustrated and described, for example, in U.S. Pat. No. 1,742,110.

Wing fences are used also for stability control, particularly in high performance, swept-wing aircraft as described, for example, in U.S. Pat. No. 2,885,161 which discloses both fixed and retractable wing fences for aircraft.

Although induced drag due to wing tip vortices is especially high during take-off and initiial climb periods of operation when the angle of the wing attack relative to the air is high, the drag due to wing tip vortices is minimal during normal level flight conditions where speed and fuel economy are important. As the fence itself imposes some drag on the aircraft, known as "parasitic drag", the drag of the fence must be balanced against its beneficial effect. Under normal or level flight conditions, periods in which the angle of attack of the wing relative to the air is low, a solid fence may have a negative effect on performance of the aircraft due to its parasitic drag. For this reason, it has been proposed as, for example, in U.S. Pat. No. 2,373,677, to provide detachable wing fences for aircraft which may be jettisoned once cruising altitude is reached.

Wing fences are particularly useful for low aspect ratio aircraft. "Aspect ratio" is a dimensionless number representing the ratio of the square of the span of a wing to its area. For rectangular wings, the aspect ratio is the ratio of the span to the chord. High aspect ratio aircraft, for example, those having long, narror tapered wings, often have no wing fence or only relatively small fences, whereas low aspect ratio aircraft, particularly high-performance aircraft, very often have large vertical fins, or fences, for stability and performance.

The present invention provides an apparatus and a method for improving the lift-to-drag ratio of an airfoil. In one of its more particular aspects, it relates to an improved aircraft wing fence or dam.

The present invention provides an improved aircraft wing fence, referred to hereinafter as an "open fence", which substantially reduces the induced drag of the wing at high angles of attack, for example, during take-off and climb periods, improves landing performance of the aircraft, and at the same time presents reduced parasitic drag as compared with a solid fence during normal or level flight operations. The aircraft wing fence of this invention is particularly useful for low aspect ratio aircraft, such as small pleasure craft, both powered aircraft and gliders, and for high-performance, swept-wing aircraft.

Throughout this specification, the term "fence" is used interchangeably with "fin", "plate" and "dam", all of which terms are in common use to describe fluid flow devices of the type referred to herein as a fence or "fluid fence".

In one preferred emboidment of the invention, an elongated, inverted U-shaped or scimatar-shaped open fence is mounted vertically on the upper surface of an aircraft wing adjacent the wing tip with the concave edge of the fence nearest the upper surface of the wing whereby an unobstructed open area equal to one sixth to one fourth the total area of the fence, including the open area, is provided between the concave edge of the fence and the upper surface of the wing. The open fence is essentially a flat plate or fin, similar to conventional wing fences and dams except for the open area between the surface of the wing and the concave inner edge of the open fence. The length of the open fence is preferably 40 to 60 percent of the chord of the wing.

Figure 2:
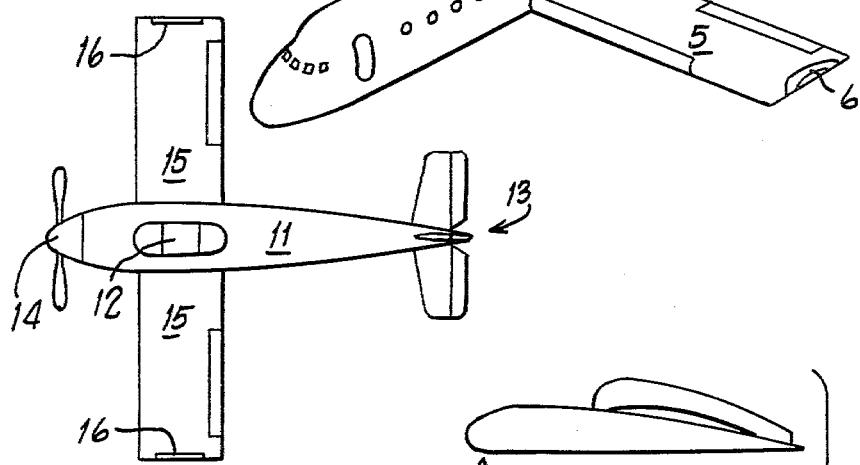
Figure 4:
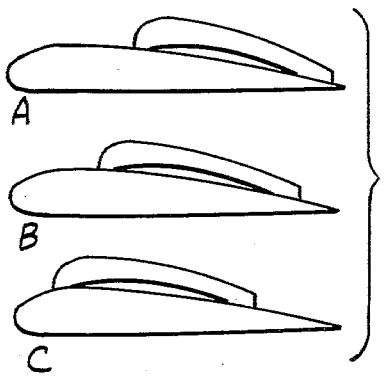
Figure 3:
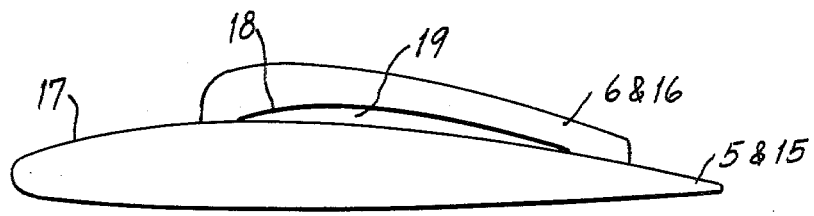

The accompanying drawings illustrate diagrammatically, the open fence of this invention as applied to airfoils, wherein: FIG. 1 of the drawings is an isometric diagrammatic illustration of a powered aircraft equipped with the open fences of this invention; FIG. 2 is a plan view illustrating an airplane or glider incorporating open fences in its wing structure. FIG. 3 is an elevational view of an airplane wing illustrating the open fence of this invention in one preferred embodiment. FIG. 4 is a diagrammatic illustration of the open fence of this invention in various positions relative to an aircraft wing or similar fluid foil.

Free flight tests made with a glider having rectangular wings and a span-to-chord ratio of the order of 0.4 to 0.5 indicate that the open fence of this invention is capable of increasing the lift-to-drag ratio of aircraft wings in normal or level flight operations by a factor of 2 as compared with the same glider equipped with solid wing tip fences (or no fence). This beneficial effect of lift-to-drag ratio under normal or level flight conditions is accomplished by the use of a fence which allows some of the air to flow around the tip of the wing, passing through the fence onto the upper surface of the wing.

As a possible explanation of the mechanism of the observed beneficial effects of the open fence structure of this invention in improving flight performance of a free flight glider, or other low aspect ratio aircraft, and without any intention of limiting the scope of the claims defining this invention it is believed that the open fence inhibits the vortex normally created by the aircraft wings and retains the additional flow of air on the upper wing surface, thus either increasing lift for a small increase in drag or retaining lift and reducing induced drag. In either case, the lift-to-drag ratio is substantially increased.

With reference to FIG. 1 of the drawings, a jet powered aircraft is illustrated, having a fuselage or body 2 providing space for passengers or cargo, jet engines 3, a tail section 4 and low aspect ratio wings 5. Low aspect wing ratio aircraft of the type illustrated are particularly well suited to short hauls or feeder lines having relatively short level flights and numerous take-offs and landings. The wings of the aircraft of FIG. 1 are fitted with open fences 6 at or near the wing tips. The fences are arranged along the chord of the wing and perpendicular to the main cross stream dimension of the fuselage 2.

Although the fences are illustrated only on the upper surfaces of the wings, it is to be understood that they may be fitted also to the lower surface of the wing also if desired. Fluid fences can be useful on the lower surface of aircraft wings, particularly in the case of aircraft used for fire fighting, crop-dusting and STOL (short take-off and landing) type aircraft. The open fences of this invention may be used on either the upper or lower surface of the wing, or on both, or in conjunction with solid fences of conventional design, the particular combination being chosen for best overall performance for the given aircraft with which it is used.

FIG. 2 of the drawings illustrates the application of open fences to a glider or small aircraft, such as various personal or pleasure craft. In this figure, the glider or airplane is provided with the usual fuselage 11 having a passenger compartment or canopy 12, a tail section 13, An optional engine 14, and wings 15. The craft may be propeller driven or jet powered, or both. Open fences 16 are provided at the tips of the wings 15 in accordance with this invention. It will be seen that the fences are perpendicular to the main cross stream dimension of the fuselage 11, i.e., a line between the roots of wings 15.

FIG. 3, an elevational view of the end of a wing showing the open wing fences 6 and 16 as they appear in plan view mounted on the upper surface 17 of an aircraft wing. It will be seen that the concave edge 18 of the fence is nearest the upper surface of the wing, i.e., adjacent the surface, and that an unobstructed open area 19 is provided between the concave edge of the fence and the surface of the wing. The open area 19 preferably amounts to from one sixth to one fourth the total area of the fence, including the open area, although larger or smaller openings may be used.

FIG. 4 illustrates three positions of the open fence relative to the chord of the wing. In FIG. 4A, the fence is placed near the trailing edge of the wing; in FIG. 4B, it is nearer the center of the chord, and in FIG. 4C, it is well forward of the center and relatively near to the leading edge of the wing.

EXAMPLES

Flight tests were carried out with model gliders having low aspect ratio rectangular wings with twin tail fins and a simulated canopy. All of the tests were conducted under free flight conditions in still air. The results of these tests are summarized in the table below.

In Cases A and B, the wings of the glider were fitted with closed fences; in Case A, the fences were conventional full chord fences on the upper surface of the wing; in Cases $B_1$ and $B_2$, the solid fences were of the same size and shape as the open fences of Cases D, E, and F, and were placed in the forward position. Fences $B_1$, $B_2$, D, E, and F all had a length of approximately 58 percent of the wing chord. The smaller open fence of Case G had a length of approximately 50 percent of that of the wing chord.

| Case | Configuration | WT, gm | L/D | Glide Angle | C.G. % C. | *DRAG, gm |
|---|---|---|---|---|---|---|
| A | Full Chord Closed Fence | 7.70 | 4.65 | 12.13° | 27.2 | 1.6189 |
| $B_1$ | Small Closed Fence | 7.33 | 4.3 | 13.09° | 27.2 | 1.6603 |
| $B_2$ | Small Closed Fence | 7.10 | 5.3 | 10.68° | 28.8 | 1.3164 |
| C | No Fence, Basic | 5.4 | 5.4 | 10.49° | 28.5 | 0.9833 |
| D | Rear Open Fence | 6.0 | 6.6 | 8.62° | 29.8 | 0.8988 |
| E | Middle Open Fence | 6.45 | 6.9 | 8.25° | 27.4 | 0.9251 |
| F | Forward Open Fence | 6.9 | 7.8 | 7.31° | 25.8 | 0.8774 |
| G | Smaller Forward Open Fence | 6.9 | 8.1 | 7.04° | 25.8 | 0.8454 |

*Drag for total glider, including fins and simulated canopy.

As can be seen, the use of the open fence in Cases F and G reduced the drag of the glider almost half, increasing the lift-to-drag ratio of the glider by 74% as compared with the full chord closed fence. The smaller (50 percent chord) open fence in the forward position, Case G reduced the drag of the glider to approximately 64 percent of the drag for Case $B_2$, the best results obtained with a closed fence. The lift-to-drag ratio for the glider equipped with the smaller open fence, Case G, is approximately 50 percent higher than for the glider with no wing fences, Case C.

Throughout this specification and in the appended claims, the terms elongated "U-shaped" and "scimitar-shaped" are to be taken as equivalent descriptive terms for the shape of the open fence of this invention.

I claim:

1. In combination of a fluid foil designed to create by its motion through a fluid a force component perpendicular to the direction of its motion and a fluid fence attached thereto in a plane substantially perpendicular to said foil, the improvement wherein said fence comprises an elongated U-shaped or scimitar-shaped open fence having a concave edge and a convex edge, the fence attached at its extremities to the surface of said foil with its concave edge adjacent the foil thereby providing an unobstructed opening between the surface of the foil and the concave edge of said fence.

2. In combination with an aircraft wing, an elongated U-shaped or scimitar-shaped open fence having a concave edge and a convex edge and attached at its extremities to said wing with its concave edge nearest the surface of the wing and providing an unobstructed opening between said wing and said fence.

3. An aircraft wing fence as defined in claim 2 wherein said opening between said wing and said fence has a free cross-sectional area within the range of one sixth to one fourth the cross-sectional area of the entire fence including said opening.

4. An aircraft wing fence as defined in claim 3 wherein the overall length of said fence is 40 to 60 percent of the wing chord.

5. An aircraft wing fence as defined in claim 4 wherein said fence is mounted forward of the center of the chord of said wing.

6. An improved aircraft wing fence which comprises an elongated U-shaped or scimitar-shaped open fence having a concave edge and a convex edge and mounted on the upper surface of an aircraft wing substantially along the chord of the wing with its concave edge adjacent the upper surface of the wing and providing an unobstructed opening between the upper surface of the wing and the concave edge of said fence.

7. A structure as defined in claim 6 wherein said fence is positioned at the tip of the wing.

* * * * *